United States Patent [19]

Blackburn et al.

[11] Patent Number: 4,521,042
[45] Date of Patent: Jun. 4, 1985

[54] THREADED CONNECTION

[75] Inventors: Jan W. Blackburn, Kingwood; Burl E. Baron, Houston, both of Tex.

[73] Assignee: Hydril Company, Los Angeles, Calif.

[21] Appl. No.: 510,881

[22] Filed: Jul. 5, 1983

[51] Int. Cl.³ ............................................. F16L 25/00
[52] U.S. Cl. ..................................... 285/334; 285/355; 285/391
[58] Field of Search ................ 285/334, 333, 355, 390

[56] References Cited

U.S. PATENT DOCUMENTS

| | | | |
|---|---|---|---|
| 3,489,437 | 1/1970 | Duret | 285/334 X |
| 4,161,332 | 7/1979 | Blose | 285/334 |
| 4,192,533 | 3/1980 | Blose | 285/334 |

OTHER PUBLICATIONS

Hydril Bulletin 2654.

*Primary Examiner*—Richard J. Scanlan, Jr.
*Attorney, Agent, or Firm*—Dodge & Bush

[57] ABSTRACT

A pipe joint and threaded pin and box members adapted for use therein are disclosed in which two-stepped thread surfaces are axially separated by dissimilar angled positive angle torque and sealing surfaces and internal and external sealing surfaces are provided on both ends of the threaded surfaces. Protective non-engaging shoulders are provided adjacent the external sealing surfaces. Cooperating end shoulders are provided on the end of the pin member and the interior end of the counterbore of the box member. Preferably the end shoulders are provided approximately perpendicularly to the internal sealing surfaces, the box end shoulder acting to trap the pin end shoulder under conditions of high joint interior pressure.

5 Claims, 6 Drawing Figures

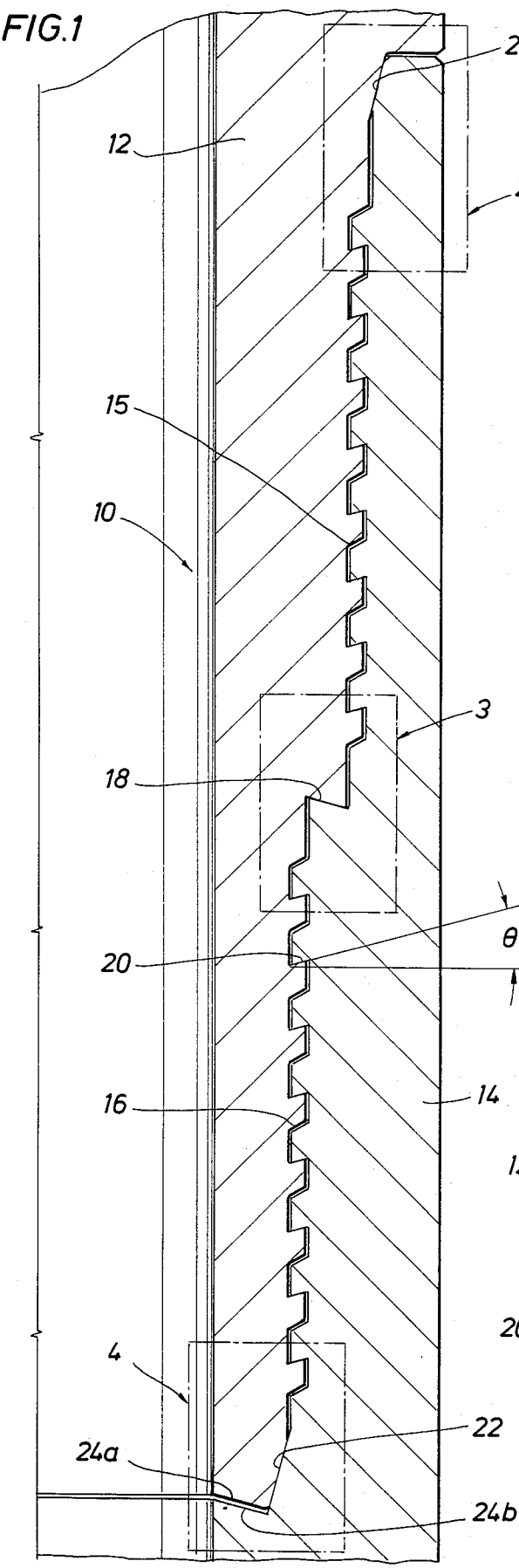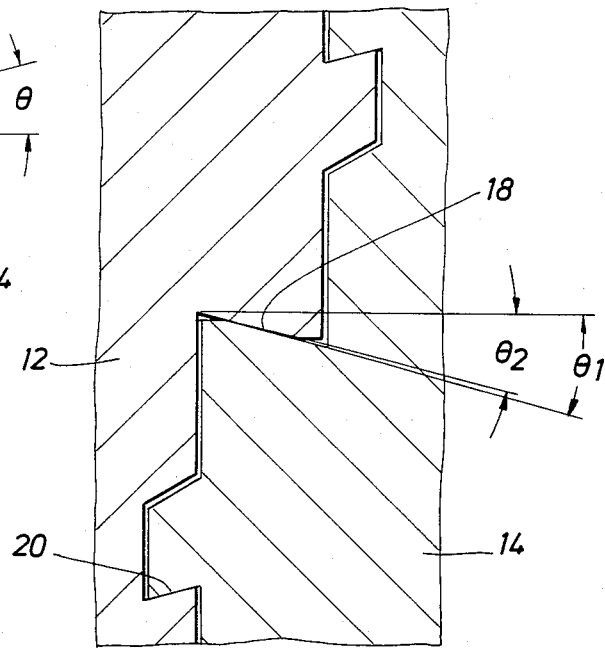

THREADED CONNECTION

BACKGROUND OF THE INVENTION

1. Field of the Invention

This invention relates generally to oil and gas well tubular casing and more particularly has to do with the construction of high pressure casing joints operable when made-up and run into a well to withstand extreme fluid pressures and for sealing off thereof to prevent escape of high pressure fluid or gas through the tubular casing assembly at the joints.

2. Description of the Prior Art

The search for oil and gas reserves has brought about the exploration of ever deeper formations. These deeper formations require longer strings of production pipe, casing and liners used in the exploration and production of oil and gas. Such wells may be subject to extremely high pressures from formation zones. The increased length of tubular strings imposes the upper portion of the string to very high tensile loads and where high pressure exists from deeper formations may also expose the upper portion of the string to high internal pressures where there is little or no off-setting external pressure on the casing or tubing. With standard joints there are limitations to the depths to which a string of casing or tubing can be run.

Casing joints are known which are reliable and versatile and combine excellent annular clearance with optimal tensile strength and three positive metal-to-metal seals for many casing applications. Such joints have been commercially available for some time and are sold under the mark "Triple Seal" by the Hydril Company, the assignee of the present invention and application. Such "Triple Seal" joints have featured three positive metal-to-metal seals comprising a fourteen degree external seal, a middle ninety degree torque shoulder and seal and a fourteen degree pin to box internal seal. Such joints have been provided on casing members which have been formed and stressed relieved. The joints have been offered as two-step cylindrical threaded surfaces with modified API buttressed threads. The joint sold under the "Triple Seal" mark has featured a ninety degree torque shoulder intermediate the two steps of the thread profile.

A new generation thread design sold under the mark "Triple Seal" or "MAC" has featured a reverse angle intermediate torque shoulder between the two steps where the reverse angle is a positive angle with respect to a radius through the torque shoulder. The "MAC" connection has featured dissimilar angles on the reverse angle torque shoulder.

There has developed a need for even more performance from a "Triple Seal" type casing connection. It is therefore an object of the invention to provide a casing connection or tubular joint which may be provided on a standard upset of the end of tubular members which has very high joint efficiency.

It is another object of the invention to provide protection against damage in the field of the external seals of the connection.

It is a further object of the invention to provide locking of the intermediate positive angle torque shoulder with the threads on either side of the combination torque shoulder and sealing surface.

It is a further object of the invention to provide facing shoulders on the end of the pin and the interior end of the counterbore of the box whereby under extreme internal pressures, the box traps the end of the pin causing the box and pin to flex together.

SUMMARY OF THE INVENTION

The objects of the invention described above as well as other advantages and features of the invention are incorporated in a pipe joint of coaxially mating pin and box members comprising first and second pairs of interengaged threads on the respective pin and box members. The first pair of threads is axially spaced from the second pair of threads. The threads of the respective members are hooked threads, that is they have negatively angled load flanks. A pair of generally frusto-conical intermediate shoulders or sealing surfaces are provided between the stepped thread surfaces. The angle of the intermediate positive angle shoulder or sealing surface on the box member is greater than the intermediate angle shoulder or sealing surface on the pin member. The dissimilar angles of the positive angled intermediate shoulders effect an intermediate seal on the intermediate shoulders when the joint is fully made-up.

The joint further comprises cooperating internal frusto-conical sealing surfaces respectively on the counterbore of the box member and the free end of the pin member. The internal sealing surface of the box member is an annular outwardly facing internal shoulder inclined at an angle with respect to the axis of the box member. The internal sealing surface of the pin member is inclined inwardly toward the end of the pin member. The angle of incline of the internal pin shoulder is substantially the same as that of the internal box member.

The joint preferably comprises a third metal-to-metal seal comprising cooperating external frusto-conical sealing surfaces on the outer end of the counterbore of the box member and the inner end of the pin member. The external sealing surface of the box member is an annular outwardly facing external shoulder inclining outwardly at an angle with respect to the axis of the box member, while the external sealing surface of the pin member inclines inwardly toward the end of the pin member. The angle of incline of the external pin shoulder is substantially the same as the external box sealing surface.

Advantageously, cooperating non-engaging outwardly extending protective shoulders on the pin and box members adjacent the external sealing surfaces of the pin member and the box member serve to protect the external sealing surfaces of the pin and box members under field conditions of shipping, storage and handling.

According to another feature of the invention, facing shoulder surfaces are provided on the end of the pin member and the interior end of the counterbore of the box member where said shoulder surfaces are preferably non-engaging on make-up of the joint. The facing shoulders provided according to one embodiment of the invention are approximately perpendicularly to the internal frustro-conical sealing surface on the box and pin members. The shoulder surfaces tend to engage when the joint is subjected to internal pressure. The end of the box member acts to trap the end of the pin member under conditions of extremely high internal pressure thereby causing the end of the box member and the end of the pin member to flex radially together.

The sealing surfaces and threaded surfaces described above are preferably provided on upset ends of two sections of tubular members such as casing and liner pipe. Advantageously, the positive reverse angled torque shoulders and seals provided at dissimilar angles in combination with the hooked threads lock the box member from swelling and the pin from collapsing under conditions of high internal pressure or external pressure.

The invention includes the respective pin and box members which cooperate to form the joint described above.

BRIEF DESCRIPTION OF THE DRAWINGS

The invention will be more readily understood from the following description of the invention and by reference to the accompanying drawings forming a part thereof and wherein one or more examples of the invention is shown and wherein:

FIG. 1 is a cross-section illustration of a joint according to the invention, showing the features of two-stepped cylindrical hooked threads axially separated by a positive angled intermediate shoulder/sealing surface of dissimilar angles;

FIG. 2 is an illustration of the external sealing surfaces in greater detail and illustrating the protective shoulder provided at the end of the box member and the beginning of the pin member;

FIG. 3 is a detailed illustration showing the positively angled intermediate shoulder/sealing surface and further illustrating the hooked threads provided on either side of the intermediate shoulder/sealing surface;

DESCRIPTION OF THE INVENTION

Figure 4:
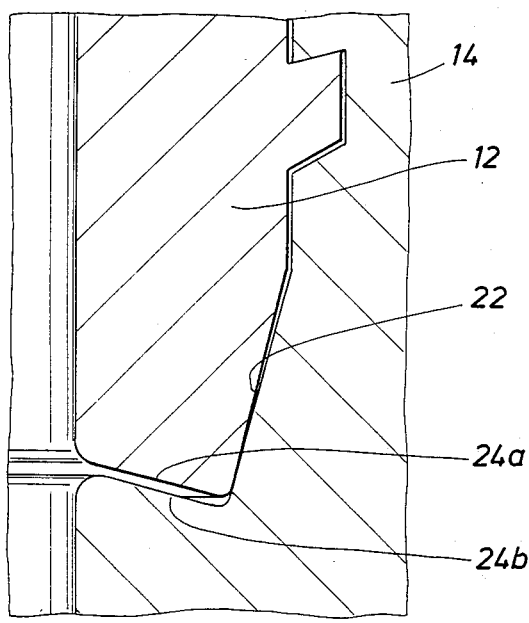
FIG. 4 is an illustration of the facing surfaces provided on the end of the pin member and the interior end of the box member in which the surfaces are provided approximately perpendicularly to the internal metal-to-metal sealing surfaces.

FIG. 1 illustrates a pipe joint or connection 10 of a pin member 12 and box member 14. First and second pairs of interengaged threads 15 and 16 are provided preferably upon upset ends of tubular members to be connected. A pair of cooperating intermediate shoulders/sealing surfaces 18 are provided between the first and second pairs of interengaged threads. According to the invention, the threads are semi-dovetail type threads. In other words, the threads have negatively angled load flanks 20.

The invention is further characterized by providing dissimilar angles on the positively angled intermediate shoulder 18 of the pin and box members. Preferably, the positive angle of the shoulder on the box member is at an angle $\theta 1$ greater than the angle $\theta 2$ provided as the positive angle shoulder on the pin member. The dissimilar angles of the positive angled intermediate shoulders of the pin and box members serve to provide a sealing surface at the intermediate shoulders on make-up of the connection which distributes the sealing load uniformly across the sealing surface and in combination with the negative angle load flanks or the hooked threads on either side of the intermediate shoulders/sealing surfaces 18 helps lock the connection together. That is, the box is locked to the pin under conditions of high internal pressure and the pin is locked to the box under conditions of high external pressure or compression of the tubular members.

According to the invention, cooperating internal sealing surfaces 22 and cooperating external sealing surfaces 24 are provided on either side of the first and second pairs of interengaged threads 15, 16. Preferably, the internal sealing surfaces are frusto-conical sealing surfaces provided at substantially the same angle with respect to the radius of the connection. Typically, this angle is fourteen degrees. Likewise, the cooperating external sealing surfaces 24 on the pin and box member are also frusto-conical sealing surfaces provided at an angle of approximately fourteen degrees.

Thus there is provided according to the invention, a tubular connection or joint 10 which has three sealing surfaces. The cooperating sealing surfaces 22 act primarily to provide a sealing surface against high internal pressures. Likewise the cooperating external sealing surfaces 24 act to seal the joint together against high external pressures and the sealing surfaces 18 provided by the sealing effect of the positive angled intermediate shoulders provide a sealing and locking capability in combination with the hooked threads on either side of the intermediate shoulder which locks the pin and box together and seals both against internal and external pressures.

According to the invention, box member 14 has its free end 26 terminated in an outwardly extending shoulder 28. Likewise, pin member 12 has an outwardly extending shoulder 30. These cooperating facing shoulders are provided to protect the external sealing surfaces from damage during transport, storage and handling prior to being made-up to a tubular joint 10.

As illustrated in FIGS. 1 and 4, the end of the pin member 12 and the interior end of the box member 14 are provided with cooperating facing shoulders 24a and 24b. According to the embodiment of the invention illustrated in FIG. 1, the facing shoulders 24a and 24b are provided approximately perpendicularly to the angled surfaces 22. As illustrated in FIGS. 4 and 1, the surfaces 24a and 24b are non-engaging on full make-up of the tubular joint. However, under conditions of internal pressure of the end of the pin member 12 and the end of the box member 14 tend to move radially outwardly thereby tending to urge the facing surfaces 24a and 24b into engagement. Under conditions of extremely high pressures, the surfaces 24a and 24b may engage whereby the box member 14 cannot move radially outwardly away from the pin without forcing the pin end also radially outwardly. Therefore, the hooked end surfaces as illustrated in FIGS. 4 and 1 provide an important feature of the connection 10 in maintaining the internal pressure against separation of the pin and box members.

Figure 5:
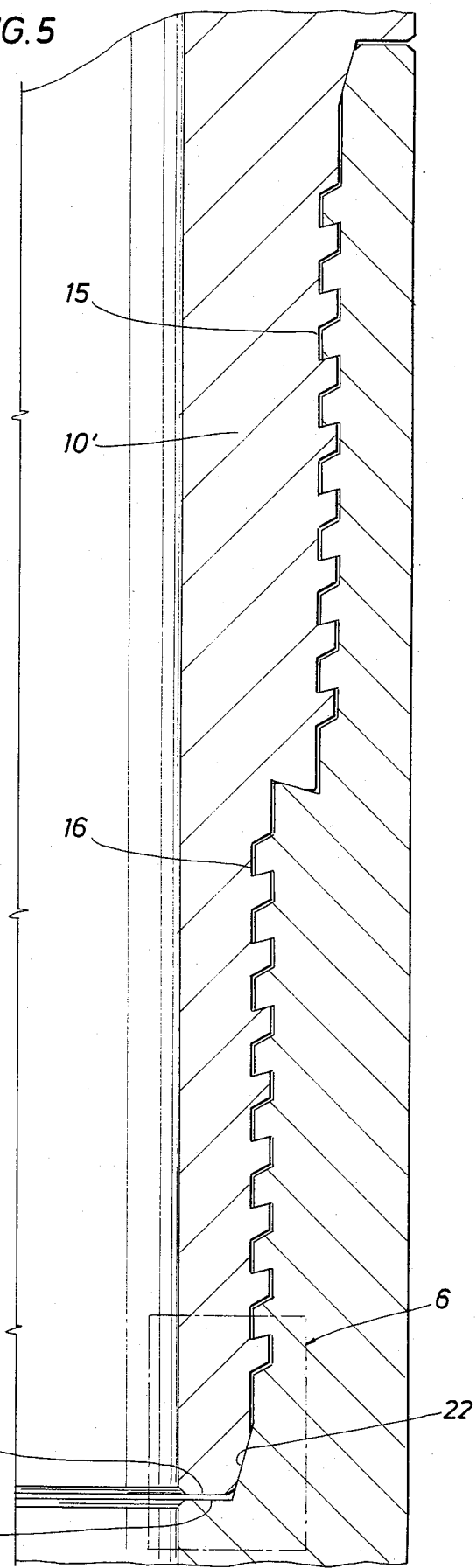
FIGS. 5 and 6 illustrate an alternative embodiment of the invention of FIG. 1 in which the facing surfaces provided at the end of the pin member and the interior end of the box member are provided perpendicularly to the axis of the joint.
Figure 6:
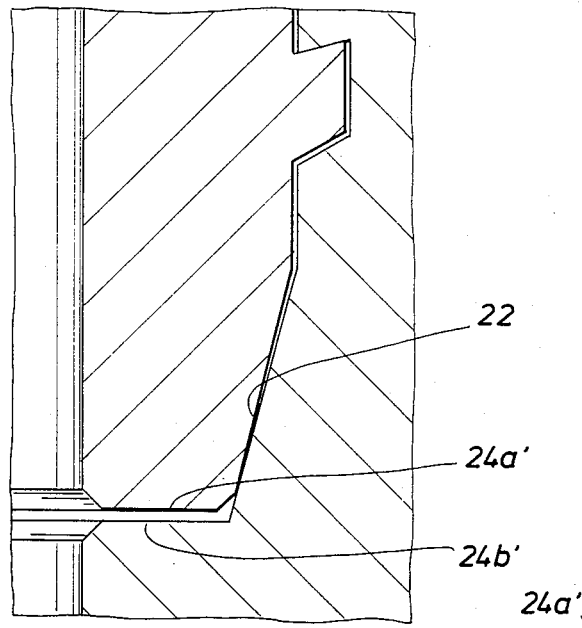

FIGS. 5 and 6 illustrate an alternative embodiment of the invention identical to that illustrated in FIG. 1 with the exception that the end members 24a' and 24b' are provided, not perpendicularly to the surfaces 22, but rather are provided along a radius of the joint, that is the surfaces 24a and 24b are provided perpendicularly to the axis of the joint.

From the foregoing, it is apparent that there has been provided a pipe joint or connection for use in oil and gas well tubular members. Various modifications and alterations in the described structures will be apparent to those skilled in the art from the foregoing description which do not depart from the spirit of the information. For this reason these changes are desired to be included from the scope of the appended claims. The appended claims recite the only limitations of the present invention and the descriptive manner which is employed for setting forth the present embodiment is to be interpreted as illustrative and not limitative.

What is claimed is:

1. A pipe joint of coaxially mating pin and box members comprising, first and second pairs of interengaged threads on the respective members, the first pair of threads axially spaced from the second pair of threads, the threads of the respective members having negatively angled load flanks, a pair of generally positively angled frusto-conical intermediate shoulders on the members disposed axially between the first and second pairs of threads, the angle of the intermediate positive angled shoulder on the box member being greater than the intermediate angled shoulder on the pin, the dissimilar angles of the positive angled intermediate shoulders effecting an intermediate seal on the intermediate shoulders when the members are fully interengaged, cooperating external frusto-conical sealing surfaces respectively on the outer end of the counterbore of the box member and the inner end of the pin member, the external sealing surface of the box member being an annular outwardly facing external shoulder inclining outwardly at an angle with respect to the axis of the box member, the external sealing surface of the pin member inclining inwardly toward the end of the pin member, the angle of incline of the external pin shoulder being substantially the same as that of the external sealing surface, and cooperating non-engaging protective shoulders on the pin and box members adjacent the external sealing surfaces of the pin member and the external sealing surface of the box member.

2. A pipe joint of coaxially mating pin and box members comprising, first and second pairs of interengaged threads on the respective members, the first pair of threads axially spaced from the second pair of threads, the threads of the respective members having negatively angled load flanks, a pair of generally positively angled frusto-conical intermediate shoulders on the members disposed axially between the first and second pairs of threads, the angle of the intermediate positive angled shoulder on the box member being greater than the intermediate angled shoulder on the pin, the dissimilar angles of the positive angled intermediate shoulders effecting an intermediate seal on the intermediate shoulders when the members are fully interengaged, cooperating internal frusto-conical sealing surfaces respectively on the counterbore of the box member and the free end of the pin member, the internal sealing surface of the box member being an annular outwardly facing internal shoulder inclining at an angle with respect to the axis of the box member, the internal sealing surface of the pin member inclining inwardly toward the end of the pin member, the angle of incline of the internal pin shoulder being substantially the same as that of the internal box shoulder, and facing shoulder surfaces on the end of the pin member and the interior end of the counterbore of the box member, said shoulder surfaces being non-engaging on make-up of the joint.

3. The joint of claim 2 wherein the facing shoulder surfaces are approximately perpendicular to the internal frusto-conical sealing surfaces on the box and pin members, said shoulder surfaces tending to engage when the joint is subjected to internal pressure, the end of the box member acting to trap the end of the pin member under conditions of extremely high internal pressure causing the end of the box member and the end of the pin member to flex radially together.

4. A pipe joint of coaxially mating pin and box members comprising, first and second pairs of interengaged threads on the respective members, the first pair of threads axially spaced from the second pair of threads, the threads of the respective members having negatively angled load flanks, a pair of generally positively angled frusto-conical intermediate shoulders on the members disposed axially between the first and second pairs of threads, the angle of the intermediate positive angled shoulder on the box member being greater than the intermediate angled shoulder on the pin, the dissimilar angles of the positive angled intermediate shoulders effecting an intermediate seal on the intermediate shoulders when the members are fully interengaged, cooperating internal frusto-conical sealing surfaces respectively on the counterbore of the box member and the free end of the pin member, the internal sealing surface of the box member being an annular outwardly facing internal shoulder inclining at an angle with respect to the axis of the box member, the internal sealing surface of the pin member inclining inwardly toward the end of the pin member, the angle of incline of the internal pin shoulder being substantially the same as that of the internal box shoulder, facing shoulder surfaces on the end of the pin member and the interior end of the counterbore of the box member, said shoulder surfaces being non-engaging on make-up of the joint, cooperating external frusto-conical sealing surfaces respectively on the outer end of the counterbore of the box member and the inner end of the pin member, the external sealing surface of the box member being an annular outwardly facing external shoulder inclining outwardly at an angle with resepct to the axis of the box member, the external sealing surface of the pin member inclining inwardly toward the end of the pin member, the angle of incline of the external pin shoulder being substantially the same as that of the external sealing surface, cooperating non-engaging outwardly extending protective shoulders on the pin and box members adjacent the external sealing surfaces of the pin member and the external seal surface of the box member, and the first and second pairs of interengaged threads are provided on upset ends of two sections of pipe.

5. The joint of claim 4 wherein the facing shoulder surfaces are approximately perpendicular to the internal frustro-conical sealing surfaces on the box and pin members, said shoulder surfaces tending to engage when the joint is subjected to internal pressure, the end of the box member acting to trap the end of the pin member under conditions of extremely high internal pressure causing the end of the box member and the end of the pin member to flex radially together.

* * * * *